United States Patent [19]

Ikeda

[11] Patent Number: 5,520,086
[45] Date of Patent: May 28, 1996

[54] BOOSTER

[75] Inventor: Masahiro Ikeda, Saitama-ken, Japan

[73] Assignee: Jidosha Kiki Co., Ltd., Tokyo, Japan

[21] Appl. No.: 429,661

[22] Filed: Apr. 27, 1995

[30] Foreign Application Priority Data

Apr. 28, 1994 [JP] Japan .................... 6-114185

[51] Int. Cl.$^6$ ..................... F15B 9/10
[52] U.S. Cl. ..................... 91/376 R
[58] Field of Search ..................... 91/376 R

[56] References Cited

U.S. PATENT DOCUMENTS

| | | | |
|---|---|---|---|
| 4,005,638 | 2/1977 | Takeuchi | 91/376 R |
| 4,970,939 | 11/1990 | Fecher et al. | 91/376 R |
| 5,367,941 | 11/1994 | Gautier et al. | 91/376 R |

FOREIGN PATENT DOCUMENTS

| | | | |
|---|---|---|---|
| 2148427 | 5/1985 | United Kingdom | 91/376 R |

*Primary Examiner*—F. Daniel Lopez
*Attorney, Agent, or Firm*—Flynn, Thiel, Boutell & Tanis

[57] ABSTRACT

First seat $S_1$ and second seat $S_2$ on valve element 18 are axially separated to provide a tubular connection 18a therebetween. Support member 42 is fitted into the tubular connection 18a, and carries a sound extinguishing member 41 in the form of a cylindrical metallic filter on its inner peripheral surface. Upon actuation of the booster, pressure fluid from pressure passage 23 flows into variable pressure chambers B, D after passing through the second seat $S_2$ which is then broken, and then through the inside of the sound extinguishing member 41. The pressure fluid, which passed through the second seat $S_2$, flows inside the sound extinguishing member 41, whereby its flow direction is rectified, and is prevented from assuming a vortical turbulent flow. This reduces the generation of sounds during the suction stroke without degrading the response of the booster.

4 Claims, 2 Drawing Sheets

BOOSTER

BACKGROUND OF THE INVENTION AND RELATED ART STATEMENT

The invention relates to a booster as may be used in a brake of an automobile or the like, and more particularly, to a booster capable of reducing generation of sounds during a suction stroke when a pressure fluid is introduced.

Generally a booster comprises an enclosed vessel formed by a front and a rear shell, a power piston and an associated diaphragm which divides the interior of the enclosed shell into a constant pressure chamber and a variable pressure chamber which are located toward the front and the rear shell, respectively, a valve body disposed adjacent to the inner periphery of the power piston for integral reciprocatory motion therewith, and a valve mechanism housed within the valve body and controlled to be opened or closed in response to a brake pedal operation. When a brake is to be applied, the valve mechanism is opened and closed to introduce the atmosphere into the variable pressure chamber to create a pressure differential between the variable and the constant pressure chamber, which acts upon the power piston to perform a booster function. When the brake is released, the communication between the variable pressure chamber and the atmosphere is interrupted, and the variable pressure chamber is caused to communicate with the constant pressure chamber, thereby allowing the power piston to be returned to its inoperative position under the resilience of a return spring.

A conventional valve mechanism used in a booster as mentioned above is illustrated in FIG. 2, and its construction will be described below. A valve mechanism 13 comprises an annular, first valve seat 14 formed on an end face, in a radially inner region, of a valve body 6 which undergoes a reciprocatory motion within an enclosed vessel (only part of a rear shell 2 being shown), an annular, second valve seat 16 formed on an end face of a valve plunger 15 which is slidably fitted into the valve body 6 in axial alignment therewith, and a valve element 18 disposed inside the valve body 6 and urged by a spring 17 to be seated upon either the first valve seat 14 or the second valve seat 16.

Formed in the valve body 6 are a constant pressure passage 19 which allows a space $E_1$ radially outward of a first seat $S_1$ defined by the contact between the first valve seat 14 and the valve element 18 to communicate with a constant pressure chamber, a pressure passage 23 which allows a space $E_2$ radially inward of a second seat $S_2$ defined by the contact between the second valve seat 16 and the valve element 18 to communicate with a source of pressure fluid, and a variable pressure passage 21 which allows a space $E_3$ located between the first seat $S_1$ and the second seat $S_2$ to communicate with a variable pressure chamber.

When a conventional booster incorporating the valve mechanism 13 as mentioned above is inoperative, the valve plunger 15 retracts, whereby the valve element 18 is seated upon the second valve seat 16 and is removed from the first valve seat 14, as shown in FIG. 2. Thus, in the inoperative position, the second seat $S_2$ defined by the second valve seat 16 and the valve element 18 which contact each other is established to close the pressure passage 23 while the first valve seat 16 and the valve element 18, which would define the first seat $S_1$, are removed from each other, thereby allowing the constant and the variable pressure chamber to communicate with each other through the constant pressure passage 19 and the variable pressure passage 21, thus allowing them to assume an equal pressure.

By contrast, when the booster is actuated, the depression of a pedal acts through an input shaft 25 to drive the valve plunger 15 forward to cause the valve element 18 to be seated upon the first valve seat 14, whereby the contact therebetween establishes the first seat $S_1$. Accordingly, the constant pressure passage 19 is closed, interrupting the communication between the constant and the variable pressure chamber. A continued advancement of the valve plunger 15 moves the valve element 18 away from the second valve seat 16. When the second seat $S_2$ is no longer established, the pressure passage 23, which is located radially inside, communicates with the variable pressure chamber 21, which is located outside thereof, whereby the pressure fluid which has passed through the region of the second seat $S_2$ is introduced into the variable pressure chamber to develop a pressure differential between the constant and the variable pressure chamber, which actuates the booster.

As the pressure fluid from the pressure passage 23 is introduced into the variable pressure chamber after passing through the region of the second seat $S_2$ in the manner mentioned above, the pressure fluid will assume a vortical turbulent flow (as indicated by an arrow in FIG. 2) at a location in the immediate wake of the exit from the second seat $S_2$, disadvantageously causing the generation of sounds during the suction stroke.

To accommodate for this, it has been a practice in the art to dispose a sound absorbing member at or near an inlet to the pressure passage 23 which would allow the passage of pressure fluid there through while presenting a resistance to the passage of pressure fluid. The provision of such sound absorbing member is effective to decrease the rate at which the pressure fluid is introduced into the variable pressure chamber through the second seat $S_2$, thus suppressing the described generation of sounds during the suction stroke.

However, the provision of such sound absorbing member in the pressure passage to retard the rate of the pressure fluid as it is introduced results in a disadvantage that the response of the booster is degraded.

OBJECT AND SUMMARY OF THE INVENTION

Accordingly, it is an object of the invention to provide a booster capable of suppressing the generation of sounds during the suction stroke without degrading the response.

Above object is accomplished in a booster constructed in accordance with the invention comprising a tubular valve body slidably disposed in a shell, a power piston mounted on the valve body, a constant and a variable pressure chamber defined forwardly and rearwardly of the power piston, an annular, first valve seat formed on the valve body, valve plunger slidably fitted into the valve body, an annular, second valve seat formed on the valve plunger, a valve element disposed within the valve body and urged to be seated upon either the first or the second valve seat under the resilience of a spring, a constant pressure passage formed in the valve body to allow a space, located radially outward of a first seat defined by the contact between the first valve seat and the valve element, to communicate with the constant pressure chamber, a pressure passage formed in the valve body to allow a space, located radially inward of a second seat defined by the contact between the second valve seat and the valve element, to communicate with a source of pressure fluid, and a variable pressure passage formed in the valve body to allow a space, located intermediate the first and the second seat, to communicate with the variable pressure chamber.

In accordance with the invention, the first and the second seat on the valve element are axially separate by a given distance to provide a tubular connection therebetween, in which a substantially cylindrical sound extinguishing member is disposed, which is effective to rectify the inflow direction of pressure fluid which allowing the passage thereof. In this manner, above object of the invention is accomplished.

DETAILED DESCRIPTION OF EMBODIMENT

Figure 1:
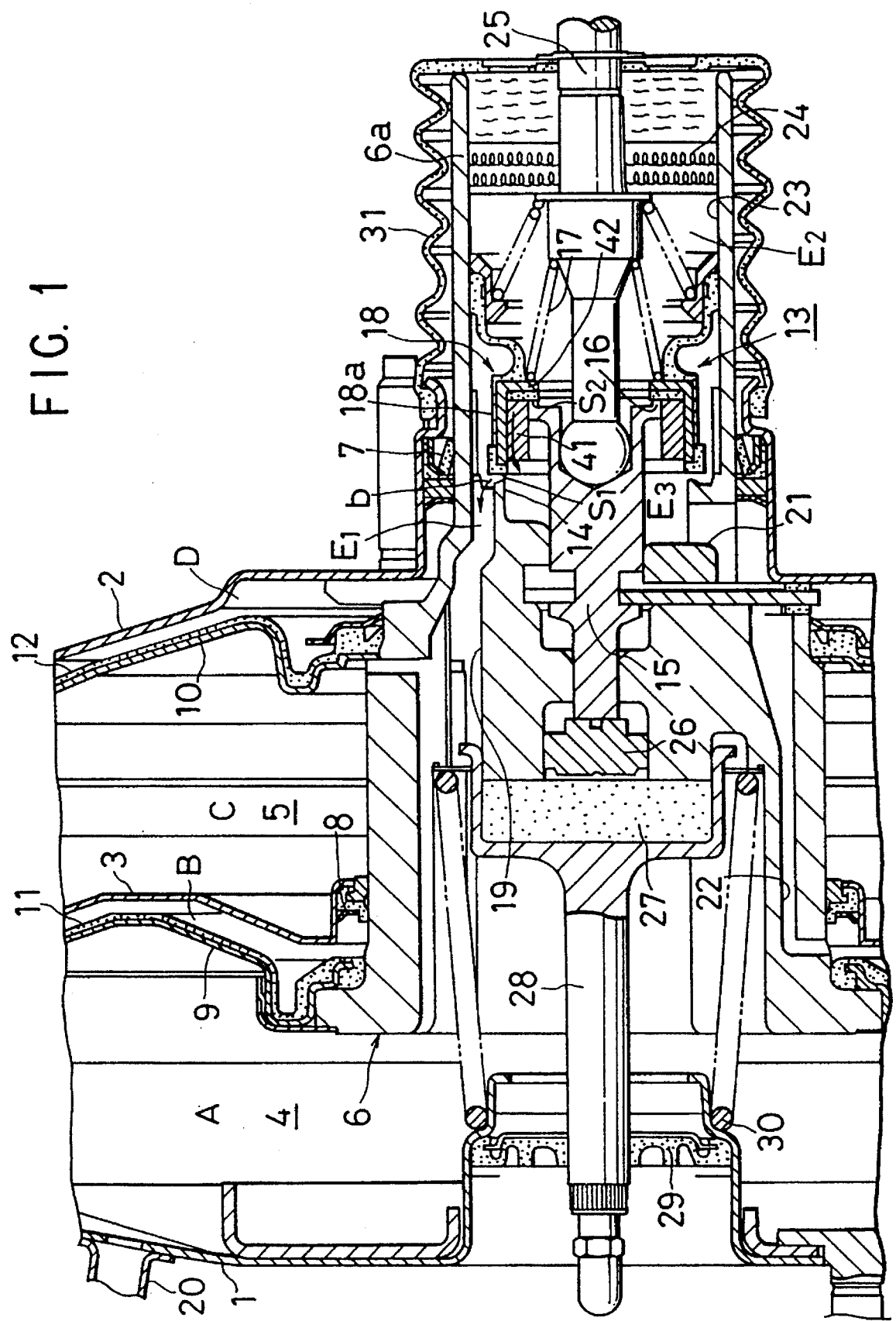
FIG. 1 is a longitudinal section of essential parts a booster according to one embodiment of the invention.
Figure 2:
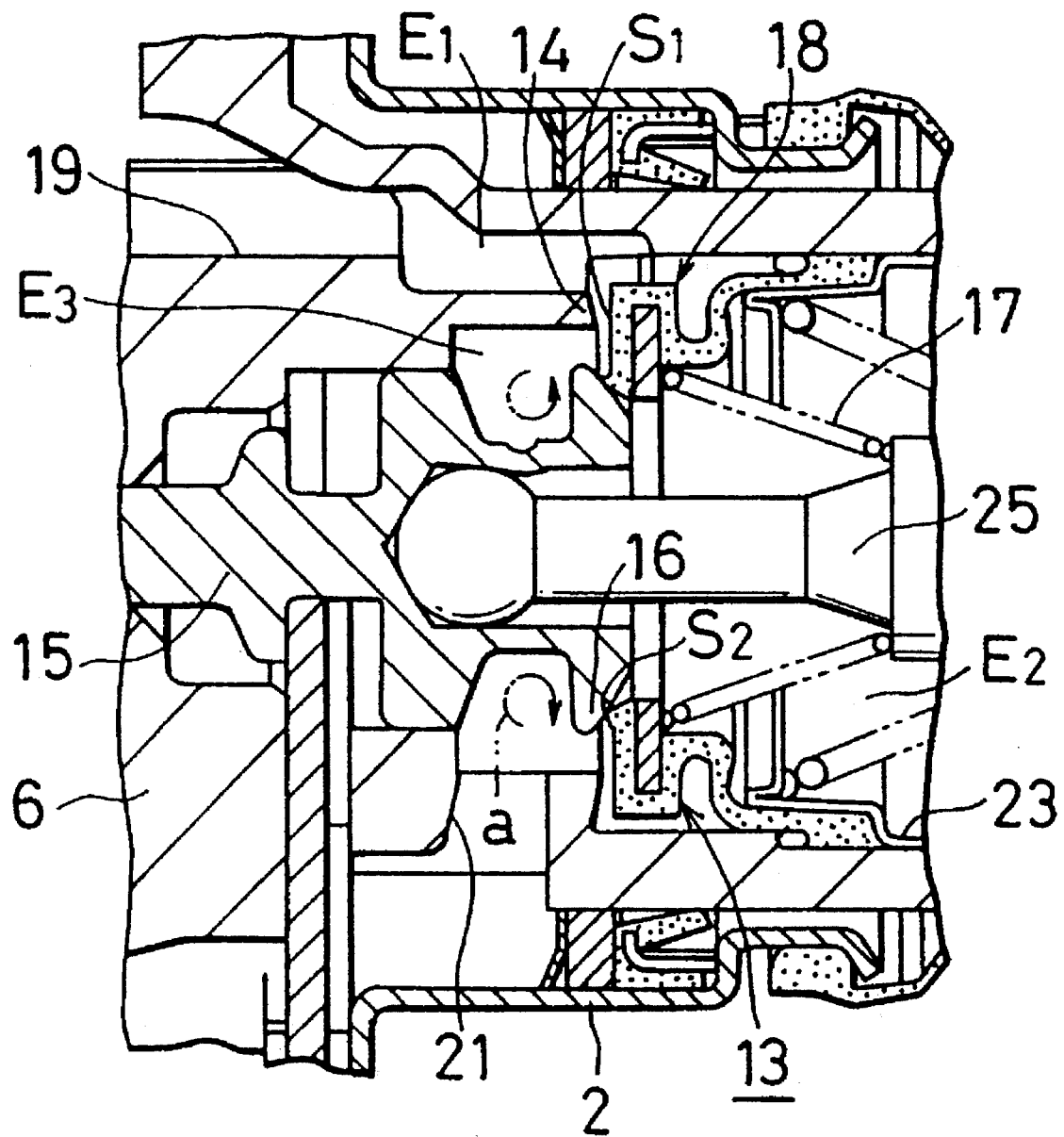
FIG. 2 is a longitudinal section of part of a conventional booster.

Referring to FIG. 1, an enclosed vessel is defined by a front shell 1 and a rear shell 2, and a center plate 3 which is centrally disposed therein divides the interior of the vessel into a front chamber 4 and a rear chamber 5. A substantially tubular valve body 6 slidably extends through the centers of the rear shell 2 and the center plate 3, with annular seal members 7, 8 maintaining a hermetic seal therebetween.

Front power piston 9 and rear power piston 10, which are disposed in the front chamber 4 and the rear chamber 5, respectively, are connected to the valve body 6, and front diaphragm 11 and rear diaphragm 12 are applied to the back surfaces of the respective power pistons 9, 10, thus forming a constant pressure chamber A and a variable pressure chamber B across the front diaphragm 11 and also a constant pressure chamber C and a variable pressure chamber D across the rear disphragm 12.

The valve mechanism 13, which switches a fluid circuit between the two constant pressure chambers A, C and the two variable pressure chambers B, D, is disposed within the valve body 6. The valve mechanism 13 comprises the annular, first valve seat 14 formed on an end face, in an inner region, of the valve body 6, the annular, second valve seat 16 located radially inward of the annular, first valve seat 14 and formed on the right end of the valve plunger 15 which is slidably fitted into the valve body 6, and the valve element 18 urged from the right, as viewed in FIG. 1, by the resilience of the spring 17 to be seated upon either valve seat 14, 16.

Space $E_1$, located radially outward of the annular, first seat $S_1$ defined by the contact points between the first valve seat 14 and the valve element 18 communicates with the constant pressure chambers A and C through the constant pressure passage 19 formed in the valve body 6, with the constant pressure chamber A communicating with an intake manifold of an engine through a tubing 20 which introduces a negative pressure.

Space $E_3$, which is located radially inward of the first seat $S_1$, but radially outward of the annular, second seat $S_2$ defined by the contact points between the second valve seat 16 and the valve element 18, namely, located intermediate the first seat $S_1$ and the second seat $S_2$, communicated with the variable pressure chamber D through the variable pressure passage 21 formed in the valve body 6, with the variable pressure chamber D communicating with the variable pressure chamber B through an axial variable pressure passage 22 formed in the valve body 6.

Finally, space $E_2$, located radially inward of the second seat $S_2$ which is defined by the contact between the second valve seat 16 and the valve element 18, communicated with the atmosphere, which acts as a source of pressure fluid, through the pressure passage 23 formed in the valve body 6, with a filter 24 disposed in the pressure passage 23.

The right end of the valve plunger 15 is connected to the free end of the input shaft 25, the other end of which is connected to a brake pedal, not shown. On the other hand, a plunger plate 26 and a reaction disc 27 are sequentially disposed to the left of the valve plunger 15, with the reaction disc 27 fitted into the right end of a push rod 28.

The left end of the push rod 28 slidably extends through a seal member 29 and the central portion of the front shell 1 to the outside thereof for connection with the piston of a master cylinder, not shown. The valve body 6 is normally maintained in its inoperative position shown by a return spring 30.

The valve body 6 has a tubular terminal end 6a which projects axially rearward (or to the right as viewed in FIG. 1) through an opening in the rear shell 2, and tubular terminal end 6a which projects through the opening is covered by a dust cover 31 which is made from rubber.

The described arrangement and the operation thereof remain unchanged from a booster known in the art.

However, in the present embodiment, the valve element 18 and the valve plunger 15 are improved, together with the addition of a sound extinguishing member 41 at a location adjacent to and radially outward of the second seat $S_2$ where the second valve seat 16 and the valve element 18 contact each other, thereby enabling the generation of sounds during the suction stroke upon actuation of the booster to be reduced.

Specifically, the valve element 18 in the present embodiment has its first seat $S_1$ exially spaced by a given distance from the second seat $S_2$, thereby forming a cylindrical tubular connection 18a between the first seat $S_1$ and the second seat $S_2$. A substantially cup-shaped support member 42 is integrally mounted around the inner peripheral surface of the tubular connection 18a to maintain its configuration.

The left end of the support member 42 is coated with the valve element 18, and the coated region defines the first seat $S_1$. At its right end, the support member 42 is formed with a radially inward flange, the entire left side of which is convered by an annular rubber member which is adhesively and integrally bonded thereto, thus defining the second seat $S_2$.

In this manner, the support member 42 bears the inner surface of the tubular connection 18a of the valve elemen 18, and the sound extinguishing member 41 which is cylindrically shaped to allow the passage of pressure fluid therethrough is fitted around the inner peripheral surface of the support member 42. In the present embodiment, a metallic filter is employed as the sound extinguishing member 41, but the latter is not limited thereto, but may comprise a resin filter, rectifying grid, porous plate, metal meshwork or the like.

On the other hand, the valve plunger 15 of the embodiment is formed at its right end with a radially outwardly extending flange-like portion, the right end face of which is provided with an annular projection around the outer periphery thereof to provide the second valve seat 16, which defines the second seat $S_2$ together with the valve element 18 (the rubber member adhesively applied to the inner surface of the support member 42). The second valve seat 16 on the valve plunger 15 is disposed inside the sound extinguishing member 41 which has a cylindrical configuration and is movable in the lateral direction relative to the sound extinguishing member 41 along the inner peripheral surface thereof. As a consequence, when the second valve seat 16 and the valve element 18 are removed from each other or when the second seat $S_2$ is broken upon actuation of the booster, the atmosphere from the pressure passage 23 is introduced into the variable pressure chambers B and by passing through the second seat $S_2$ and through the inside of the sound extinguishing member 41. It is to be noted that in the present embodiment, no sound absorbing member is disposed within the pressure passage 23 to suppress the generation of sounds during the suction stroke by suppressing the rate at which pressure fluid is introduced.

In the described arrangement, as a brake pedal, not shown, is depressed to drive the input shaft 25 and the valve plunger 15 which is connected to the free end of the input shaft 25 forward in an integral manner, the valve element 18 will be integrally advanced while it is seated upon the second valve seat 16 until the valve element 18 becomes seated upon the first valve seat 14 on the valve body 6, whereupon the communication between the variable pressure passages 21, 22 and the constant pressure passage 19 is interrupted.

Subsequently, as the input shaft 25 and the valve plunger 15 continue to advance, the second valve seat 16 is removed from the valve element 18. In other words, the second seat $S_2$ is broken, this causes the pressure fluid from the pressure passage 23 to pass through the region of the second seat $S_2$ and through the inside of the sound extinguishing member 41 and then introduced into the variable pressure chambers B, D through the variable pressure passages 21, 22.

In this manner, after passing through the region of the second seat $S_2$, the pressure fluid flows inside the sound extinguishing member 41 which is located adjacent to and radially outside of the flow path. Hence, the pressure fluid which is introduced has its inflow direction rectified by the member 41 at a location adjacent to and radially outward of the second seat $S_2$, thereby preventing the pressure fluid from assuming a vortical turbulence at a point downstream of the second seat $S_2$.

As a consequence, the generation of sounds during the suction stroke which occurred in the prior art, pricipally as a result of a vortical turbulence of pressure fluid produced in the space $E_3$ located between the second seat $S_2$ and the first seat $S_1$ can be reduced. In addition, since no sound absorbing member which would present a resistance to the rate of introducing the pressure fluid into the pressure passage 23 is not used, any resulting degration in the response of the booster which might be caused by such sound absorbing member is avoided.

It is to be noted that in the present embodiment, when the valve element 18 returns from its operative to its inoperative position, the atmosphere in the variable pressure chambers B, D finds its way into the constant pressure chambers A, C, as indicated by an arrow b, without flowing along the sound extinguishing member 41, and hence the provision of the sound extinguishing member 41 does not cause any degradation in the response during the returning process.

While the described embodiment deals with a brake booster of tandem type which is provided with two power pistons 9, 10, it should be understood that the invention is not limited to such tandem type only, but is equally applicable to a normal booster in which the interior of the enclosed vessel is divided by a single power piston into a forwardly located constant pressure chamber and a rearwardly located variable pressure chamber.

While the invention has been shown and described above in connection with an embodiment thereof, it should be understood that the invention is not limited thereto, but that a number of changes, modifications and substitutions therein will readily occur to one skilled in the art from the above disclosure. Accordingly, all such changes modifications and substitutions as fall within the appended claims are to be constructed as lying within the scope and the spirit of the invention.

What is claimed is:

1. A booster comprising a tubular valve body slidably disposed within a shell, at least one power piston mounted on the valve body, a constant pressure chamber defined on a side of the at least one power piston, a variable pressure chamber defined on a side of the at least one power piston opposite the constant pressure chamber, an annular first valve seat formed on the valve body, a valve plunger slidably fitted into the valve body, an annular second valve seat formed on the valve plunger, a valve element disposed within the valve body and urged by the resilience of a spring to be seated upon either the first or the second valve seat, a constant pressure passage formed in the valve body to allow a first space located radially outward of a first seat defined by first contact points between the first valve seat and the valve element to communicate with the constant pressure chamber, a pressure passage formed in the valve body to allow a second space located radially inward of a second seat defined by second contact points between the second valve seat and the valve element to communicate with a source of pressure fluid, and a variable pressure passage formed in the valve body to allow a third space located intermediate the first seat and the second seat to communicate with the variable pressure chamber;

characterized in that the first and second contact points of the valve element and the first and the second valve seats are axially separated by a given distance, with a tubular connection provided between said contact points on the valve element, in which a substantially cylindrical sound extinguishing member is disposed which effectively rectifies the inflow direction of the pressure fluid while permitting the passage of the pressure fluid therethrough.

2. A booster according to claim 1 in which the tubular connection of the valve element is mounted on a substantially cup-shaped support member, and the sound extinguishing member is fitted around an inner periphery of the support member.

3. A booster according to claim 2 in which the cup-shaped support member includes a radially inwardly extending flange-like portion, and an annular rubber member adhesively bonded to a lateral side of said flange-like portion which forms the portion of the valve element that contacts the second valve seat.

4. A booster according to claim 2 in which the second valve seat formed on the valve plunger reciprocates relative to an inner peripheral surface of the cylindrical sound extinguishing member.

* * * * *